Nov. 15, 1938.    E. J. VON PEIN    2,137,150
SCALE
Original Filed Dec. 30, 1933    2 Sheets-Sheet 2
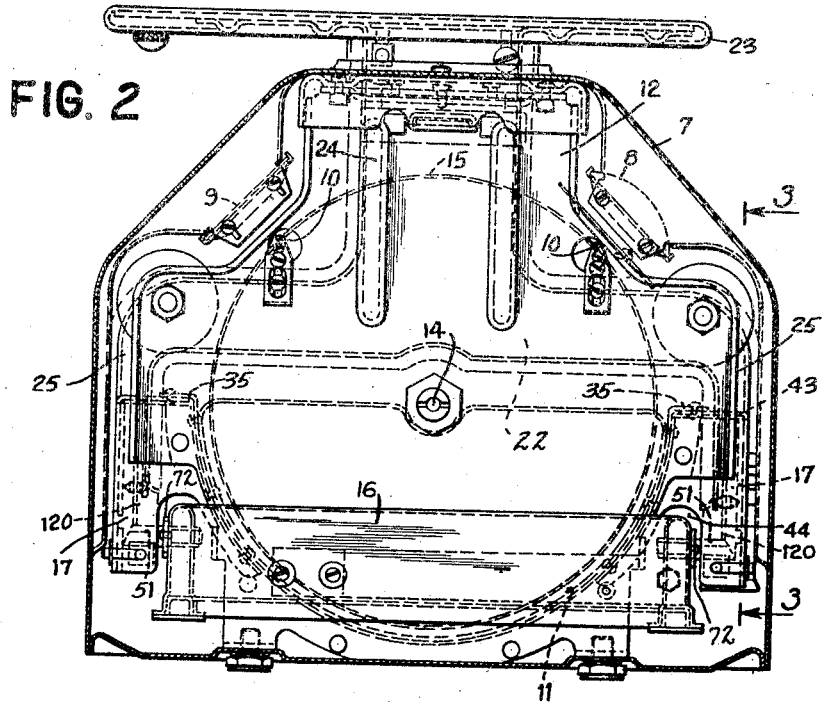
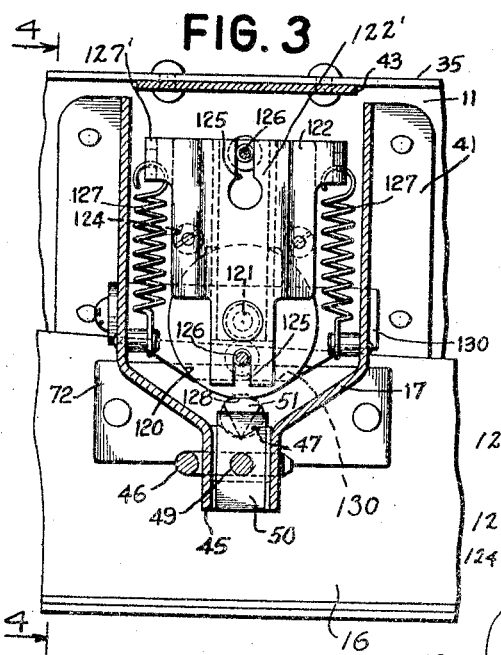
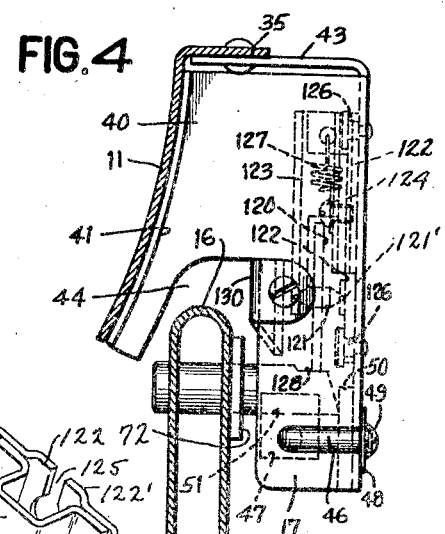
INVENTOR
Edward J. Von Pein
BY
Maréchal and Noe
ATTORNEYS Patented Nov. 15, 1938

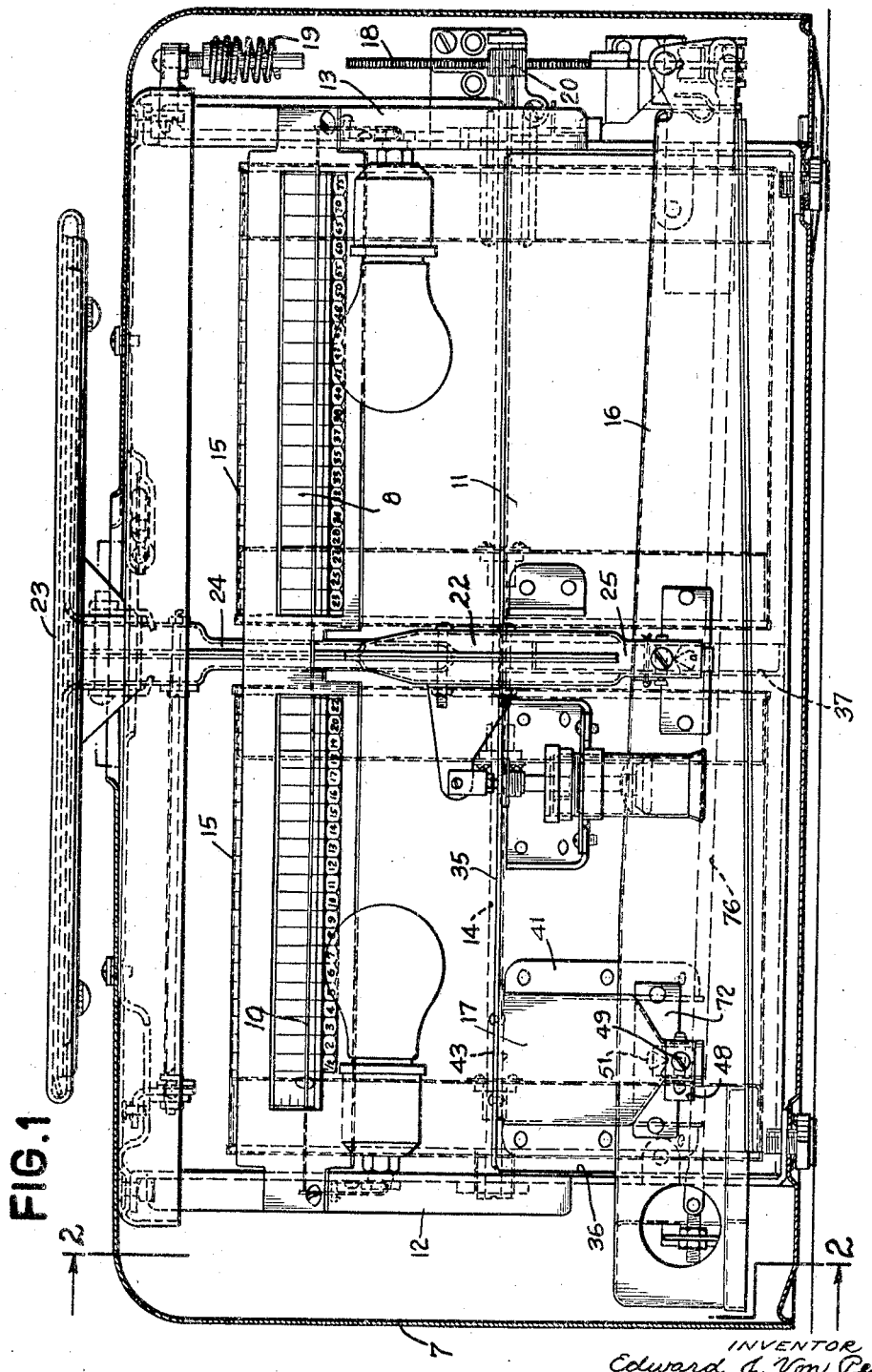

2,137,150

UNITED STATES PATENT OFFICE 2,137,150

SCALE

Edward J. Von Pein, Endicott, N. Y., assignor to The Hobart Manufacturing Company, Troy, Ohio, a corporation of Ohio Original application December 30, 1933, Serial No. 704,782. Divided and this application August 14, 1936, Serial No. 95,957. In Canada November 15, 1934

14 Claims. (Cl. 265—71)

This invention relates to scales.

It is the principal object of the invention to provide in a scale having a weighing platform and a lever, a simple and effective structure for maintaining the lever in predetermined position with respect to its fulcrum regardless of whether the load is placed upon the center or along the edge of the receiving platform.

It is another object to provide in a scale of this character a simple means which does not detract from the accuracy of the scale for yieldingly retaining the lever in its predetermined position against a tendency to become displaced as a result of the load being placed eccentrically of the platform.

A further object of the invention is the provision in a scale of a unitary lever supporting structure comprising a pivot bearing and incorporating as a part thereof a tensioned roller adapted to overlie and hold the pivot in proper operating relationship with the bearing.

Other objects and advantages of the invention will be apparent from the following description, the accompanying drawings and the appended claims.

In the drawings, which illustrate a preferred embodiment of the invention,—

Fig. 1 is a side view of a scale constructed in accordance with the present invention; the scale housing being cut away to show the interior parts thereof in elevation;

Fig. 2 is an end view in which the housing parts are cut away as indicated by the line 2—2 on Fig. 1;

Fig. 3 is a fragmentary sectional view as indicated at 3—3 on Fig. 2;

Fig. 4 is an enlarged fragmentary view taken in the same direction as Fig. 2 and indicated by the line 4—4 on Fig. 3; and Fig. 5 is a view in perspective of the hold down device.

This application is a division of my copending application Serial No. 704,782, filed December 30, 1933.

The drawings illustrate a scale of that general character known as a counter scale, and more particularly designated as a drum type computing scale such as is used by merchants for weighing and computing the value of commodities.

The illustrated scale is constructed for the most part from sheet metal and, as shown, comprises a housing 7 which serves to enclose a frame structure including a horizontally disposed semi-cylindrical shell 11 that is supported at its opposite ends by end plates which are indicated by the numerals 12 and 13.

Between the end plates is journalled a horizontal shaft 14 of a drum chart 15 that is made up of two axially spaced cylindrical sections. Each section bears weight and value designations which are visible through openings 8 and 9 in the housing 7; suitable reading lines 10 being provided. The arcuate contour of the shell 11 is concentric with respect to the chart periphery. The lower portion of the chart assembly lies within the shell 11 and is closely surrounded thereby.

Closely encompassing the frame member 11 is a rectangular lever 16; the longitudinal axis of which is generally parallel to the axis of the chart. The lever lies below the upper end of the shell 11 and is fulcrumed on brackets 17 rigidly hung from opposite sides of the shell. An end of the lever extends beyond the end plate 13 and there has suitable operating connection to the shaft 14 for movement of the drum chart 15 in accordance with lever movement. As shown, the lever end has pivotally connected thereto a rack 18 that meshes with a pinion 20 that is fixed to the chart shaft 14. A counterbalancing spring 19 is also connected to the lever end.

Lever 16 has mounted thereon a supporting member 22 by which the load receiving platform 23 is carried. The platform support is of inverted Y-shape and is vertically disposed in a plane passing between the sections of the chart 15. The stem portion 24 of the supporting member 22 carries the platform at its upper end while the bifurcated lower ends 25 of the supporting member diverge to straddle the chart shaft 14 and to engage pivots carried by the lever 16.

The lever supporting brackets 17 are constructed of sheet metal and are stamped to a general U-shape, with the legs or side portions 40 of the U-shaped part terminating at their outer ends in arcuate flanges 41 conforming in shape to the sides of the shell 11 to which they are riveted. The back portion of each bracket is turned inwardly at the top to provide a horizontal flange 43 that is fastened against the lower surface of a flange 35 which projects outwardly from the upper edge of each side of the frame member or shell 11.

Legs 40 of the brackets 17 are cut out to form passages 44 to accommodate the long sides of the lever 16 which pass therethrough. By providing such an arrangement the width of the lever is less than if the sides thereof were required to pass across the outside of the brackets. The legs 40 and the back of each bracket are narrowed at their lower ends to form a reduced U-shaped channel 45 between the sides of which is received a pin 46 on which is mounted a bearing member 47. The end portion of the pin 46 is bent at right angles and is fixed to a plate 48 secured to the base of the channel 45 by a screw 49 which is also threaded into a thrust plate 50 on the inside face of the channel. The plate 50 functions to prevent axial movement of the lever by providing a face for abutting engagement of the end of a fulcrum knife edge 51. As shown, the lever 16 is stiffened at the point of attachment of the pivots 51 by provision of plates 72. Assembly of the lever is readily accomplished by placing it in operating position prior to assembly of the bearings 47 within the brackets 17.

When a load is placed to one extreme side of the platform 23 the division of load transmitted by the platform support 22 to one side of the lever 16 is greater than that transmitted to the other side thereof. The lever therefore has a tendency to tilt transversely and may raise one fulcrum knife edge 51 from its bearing. Means are provided to prevent this tilting and as a result the pivots or knife edges are properly held to the bearings 47 of the brackets 17.

The holding means referred to are housed entirely within the fulcrum brackets 17 and include rollers 120; one for each fulcrum pivot or knife edge 51. The shaft 121 of each roller has conical pointed ends as indicated at 121' which engage conical depressions in plates 122 and 123 that support the rollers and provide a free turning bearing therefor. As shown, the plates 122 and 123 are arranged respectively as a substantially flat plate and as a U-shaped plate having diverging flanges. The plate 122 and flanges of the plate 123 are joined by screws 124 and the cooperating plates thus form a box-like structure for support of the roller pin or shaft 121. Plate 122 has vertical slots 125 to coact with guide pins 126 fastened in the base of bracket 17. The guide pins mount the plates and roller for vertical sliding movement, and coil springs 127 secured between the plates and the brackets 17 urge the rollers 120 downwardly into contact with rounded surfaces 128 formed on the pivots 51. The surface 128 of the knife edges is of cylindrical contour and is concentric with respect to the bearing engaging knife edges of the pivot members 51. The plate 122 has a narrow central portion 122' offset outwardly a slight amount to restrict the contacting area of that plate with the bracket face with which it contacts. Inturned ears 127' at the upper lateral limits of the plate 122 serve for attachment of the springs 127.

By providing a yielding mounting for the rollers 120 any excessive load or sharp downward blow on the edge of the load platform of sufficient force to lift the lever will result in yielding movement of the roller 120 on the side of the scale opposite to that at which the load is applied. The yielding mounting of the rollers permits sufficient lifting movement of the lever and pivot member under extreme conditions to prevent breakage of either the knife edge or the roller structure. Lifting movement of a pivot member is limited by an overlying plate 130 which is fastened to the bracket 17.

Any wear in the knife edged pivot member or in the roller 120 as a result of continued use will be taken up by the tensioned springs 127 so that the cooperating parts are constantly maintained in contact. The yielding mounting of the roller members serves to maintain proper engagement with the knife edge even though the roller periphery may be somewhat eccentric with respect to the roller axis of rotation.

Practically friction free operation obtains in the described construction in that the diameter of the roller is quite large so that it will turn freely under very small turning forces exerted by the engaging surface 128. Free turning movement is further afforded by the conical bearings of the roller shafts 121. As the roller engaged surface of the knife edges is concentric with respect to the pivot axis of the knife edges the rollers 120, in effect, turn on a fixed axis without any camming action; the result being that there is no reacting force tending to turn the pivot and thus affect accurate operation of the scale.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a scale having a load platform, a base lever operated by the platform and having spaced, longitudinal branches, each provided with a pivot element, fulcrum supports carrying spaced bearings one for rockably engaging each pivot element at one side thereof to rockably mount the lever, round elements mounted for rotation and for bodily movement with respect to the fulcrum supports, and means yieldably urging the round elements toward the pivot elements for engaging the pivot elements at the sides thereof opposite the sides engaged by said bearings to prevent either element leaving its bearing and to thereby prevent sidewise tilting of the lever when the load is placed at one side of the platform said round elements being rotatably actuable by the pivot elements upon rocking of the latter during the weighing operation.

2. In a scale having a load platform, a lever having a pivot, a bearing block rockably engaged by the pivot to rockably mount the lever, a roller mounted for rotation and for bodily movement, and means yieldingly urging said roller into engagement with the pivot to prevent separation of the pivot from the bearing block when the load is placed on one side of the platform, said roller being rotatably actuable by the pivot upon rocking of the pivot and lever during a weighing operation.

3. In a scale having a lever and a pivot element, lever supporting means comprising a fulcrum member having a bearing for reception of a lever pivot, the pivot having a knife edge and an oppositely positioned arcuate surface, means on said member for holding the pivot element in the bearing comprising a roller of substantial diameter slidably mounted in the fulcrum member on an axis parallel to the bearing axis for movement in a plane perpendicular to the bearing axis, and spring means urging the roller toward engagement with the arcuate surface of said pivot element.

4. In a scale having a lever and a pivot element, lever supporting means comprising a fulcrum member having a bearing for reception of a lever pivot, means on said member for holding the pivot element in the bearing comprising a box-like guide member, a roller pivotally carried within the guide member and having an axle pin engaging opposite faces thereof, means attaching the guide member to the fulcrum member for sliding movement thereon in a plane perpendicular to the axis of said bearing, and spring means urging the roller toward engagement with the pivot element.

5. In a scale having a lever and a pivot element, lever supporting means comprising a fulcrum member having a bearing for reception of a lever pivot, means on said member for holding the pivot element in the bearing comprising a roller supporting frame, a roller pivotally mounted in said supporting frame, means attaching the supporting frame to the fulcrum member for sliding movement of the supporting frame on the fulcrum member in a direction perpendicular to the axis of the bearing, and spring means at opposite sides of said supporting frame tensioned to urge the roller toward engagement with the pivot element and affording an equalized pull on said supporting frame.

6. In a scale having a lever and a pivot element, lever supporting means comprising a fulcrum member having a bearing for reception of a lever pivot, means on said member for holding the pivot element in the bearing comprising a roller supporting member slidably mounted on said fulcrum member, a roller rotatably carried by said supporting member, and a pair of springs positioned at opposite sides of said supporting member and substantially in the plane of said roller, said springs being tensioned to urge the roller toward engagement with the pivot element.

7. In a scale having a lever and a pivot element, lever supporting means comprising a fulcrum member having a bearing for reception of a lever pivot, means on said member for holding the pivot element in the bearing comprising a substantially flat plate and a U-shaped plate, the latter of said plates having oppositely projecting flanges at the open end thereof, means connecting the plate flanges and the substantially flat plate in assembly forming a box-like structure, a roller pivotally mounted in said box-like structure and comprising an axle pin having a bearing in the flat plate and in the U-shaped plate within the confines of the box-like portion, and means to urge the box-like assembly toward the said bearing to tension the roller in engagement with a pivot element carried by the bearing.

8. In a scale having a lever and a pivot element, lever supporting means comprising a fulcrum member having a bearing for reception of a lever pivot, means on said member for holding the pivot element in the bearing comprising a roller rotatably and slidably mounted in the fulcrum member on an axis parallel to the bearing axis for movement in a plane perpendicular to the bearing axis, means urging the roller toward engagement with the pivot element, and additional means spaced from and overlying the bearing to limit upward withdrawal of a pivot element from the bearing.

9. In a scale having a lever and a pivot element, lever supporting means comprising a fulcrum member having a U-shaped transverse contour, a bearing supported by said fulcrum member for reception of a lever pivot, means for holding the pivot element in the bearing comprising a frame, a roller pivotally mounted in said frame and adapted to engage a pivot element under tension acting to hold this pivot element in the bearing, said frame having a flat side with spaced pin receiving slots positioned therein perpendicularly to the bearing axis, similarly spaced pins in the fulcrum member inter-engaging said slots and providing a guideway for movement of the frame along the said fulcrum member, and spring means urging the frame toward said bearing to maintain the roller in contacting engagement with a pivot element carried by said bearing.

10. In a scale having a lever and a pivot element, lever supporting means comprising a member having a bearing for reception of a lever pivot, means on said member for holding the pivot element in the bearing comprising a roller supporting frame, a roller rotatably mounted in said supporting frame, means attaching the supporting frame to said member for movement of the supporting frame on said member in a direction perpendicular to the axis of the bearing, and yieldable means urging the roller toward engagement with the pivot element.

11. In a scale having a lever and a pivot element, lever supporting means comprising a member having a bearing for reception of a lever pivot, means on said member for holding the pivot element in the bearing comprising a roller supporting member movably mounted on said first named member, a roller rotatably carried by said supporting member and adapted to engage the pivot element, and yieldable means urging the roller toward engagement with the pivot element.

12. In a scale having a lever and a pivot element, lever supporting means comprising a member having a bearing for reception of a lever pilot, means on said member for holding the pivot element in the bearing comprising a roller mounted for rotation and for bodily movement on said member on an axis parallel to the bearing axis for movement in a plane perpendicular to the bearing axis, and yieldable means urging the roller toward engagement with the pivot element.

13. In a scale of the character described having a lever, a pivot element, and a load receiving member, lever supporting means for receiving said pivot element, and means for yieldably retaining said pivot element in operating engagement with said supporting means and adapted to resist the tendency of said pivot element to separate from said lever supporting means as a result of unbalanced load on said load receiving member including an arcuate surface formed on said pivot element, a curved pivot-engaging member, resilient means for yieldably urging said pivot-engaging member in a direction lying in a plane normal to the lever and including the pivot axis and into contact with said curved surface of said pivot element to yieldably retain the pivot in operative relation with said lever supporting means, and means for mounting said pivot-engaging member for angular movement upon movement of said lever about said pivot to maintain a yieldable force acting in said plane throughout the normal range of movement of said lever.

14. In a scale having a lever and a pivot element, a member having a bearing for reception of the pivot element in supporting relation therewith, and means for yieldably retaining said pivot and said bearing in normal operative inter-relation and adapted to resist the tendency of said pivot element to separate from said bearing as a result of unbalanced load conditions, said means comprising pivot-engaging means, means supporting said pivot-engaging means for movement with said pivot in response to normal motions of said pivot on said bearing, said supporting means also providing for movement of said pivot-engaging means as a result of movement of said pivot out of contact with said bearing, and means yieldably maintaining said pivot-engaging means in contact with said pivot to maintain said pivot on said bearing under unbalanced load conditions while providing for separation of said pivot and bearing under extreme conditions to prevent damage to the scale.

EDWARD J. VON PEIN.